United States Patent [19]

Durand

[11] 4,092,461

[45] May 30, 1978

[54] ELECTROCHEMICAL GENERATORS WITH A SEDIMENTATION BED

[75] Inventor: Pierre Durand, Clermont-Ferrand, France

[73] Assignee: Compagnie Generale des Etablissements Michelin, Clermont-Ferrand, France

[21] Appl. No.: 821,760

[22] Filed: Aug. 4, 1977

[30] Foreign Application Priority Data

Aug. 6, 1976 France .............................. 76 24465

[51] Int. Cl.² ............................................. H01M 8/04
[52] U.S. Cl. ..................................................... 429/15
[58] Field of Search ....................... 429/12, 13, 14, 15, 429/27

[56] References Cited

U.S. PATENT DOCUMENTS

| | | | |
|---|---|---|---|
| 3,527,617 | 9/1970 | Prober | 429/15 |
| 4,038,458 | 7/1977 | Jacquelin | 429/15 |

Primary Examiner—John H. Mack
Assistant Examiner—H. A. Feeley
Attorney, Agent, or Firm—Brumbaugh, Graves, Donohue & Raymond

[57] ABSTRACT

A process for the production of electric current utilizing electrochemical reactions in a generator comprising at least one cell having at least one compartment containing a liquid electrolyte and having a lower face formed at least in part by all or part of the surface of at least one electron collector arranged on the electrolyte side, said process consisting in creating a flow through the compartment of the electrolyte containing solid particles which are at least partially active and/or solid particles transporting at least one active material, the density of the particles being greater than the density of the electrolyte, is characterized by the fact that the flow takes place in such a manner that the particles form a sedimentation bed which is contiguous to the lower face of the compartment and is entrained by the electrolyte.

31 Claims, 7 Drawing Figures

ELECTROCHEMICAL GENERATORS WITH A SEDIMENTATION BED

This invention relates to processes for the production of electric current utilizing electrochemical reactions and to generators employing these processes. These generators have a cell with at least one anode compartment and one cathode compartment.

The invention relates, in particular, to generators of this type having a compartment which contains a liquid electrolyte in which solid particles are present, the electrolyte and the particles being in movement. This compartment comprises a so-called "electron-collector" member which is a conductor of electricity and is intended to collect the electric charges liberated during the electrochemical reaction carried out in the compartment or to deliver the electric charges necessary for said reaction.

These particles may, on the one hand, be formed in their entirety of a material which participates in the electrochemical reaction and called active material. This is true in particular of fuel particles, of for instance anodic active metals. These particles may, on the other hand, be partially active and/or serve as support for at least one active material. This is true in particular of particles whose electrochemically inactive center, made of a metallic material or of a material which is a nonconductor of electricity, such as for instance glass or a plastic, which has possibly been made conductive on its surface by a deposit of a metal, is covered by at least one solid, liquid, or gaseous active material, for instance in the form of a coating obtained chemically or electrochemically, or in the form of an adsorption layer, the center then acting as transport agent of the active material and possibly catalyst.

Various types of generators in accordance with the above definition have already been proposed.

It has been proposed, on the one hand, to maintain the particles within the compartment by circulating substantially only the electrolyte through this compartment. This is true in particular of compartments in which a fluidized bed is present. These generators have the drawback that they require a precise and delicate setting of numerous parameters, in particular the diameter of the particles and the speed of the electrolyte.

On the other hand, it has been proposed to create a flow of the electrolyte containing the particles through this compartment.

Thus it has been proposed that the particles be retained against the electron collector. These generators lead to a very rapid polarization of the particles. This polarization may be due to an excessively slow diffusion into the electrolyte of the products resulting from the electrochemical reaction, the products then accumulating on the active material, or in its vicinity, and preventing the reaction from continuing. This phenomenon is at times referred to as "passivation". This polarization may also be due, for instance, to exessively slow diffusion of the active material itself, particularly when it must be adsorbed on the surface of a catalytic center in order to react.

In all cases, the power of these generators is considerably limited.

It has been attempted to avoid this drawback by causing the electrolyte and the particles to flow through the compartment in such a manner that the particles are in intermittent contact with the electron collector. The following means have thus been contemplated in order to multiply the number of contacts between the particles and the electron collector:

substantially uniform agitation of the particles throughout the entire electrolyte by means of a turbulent flow in the compartment; this turbulent flow is obtained by causing the electrolyte to circulate at high speed;

flow of the electrolyte and of the particles at high speed in a cyclone, the electron collector consituting the outer cylinder of the cyclone.

Actual use has shown that these generators are not satisfactory for the following reasons:

The agitation of the particles throughout the entire electrolyte leads to a high consumption of energy and an insufficient number of contacts, which limits the power of the generator.

The use of a cyclone requires large and heavy installations so that their specific power is low.

The object of the present invention is to avoid these drawbacks.

Therefore, the process for the production of electric current, in accordance with the invention, utilizing electrochemical reactions in a generator comprising at least one cell having at least one compartment containing a liquid electrolyte and having a lower face formed at least in part by all or part of the surface of at least one electron collector arranged on the electrolyte side, said process consisting in creating a flow through the compartment of the electrolyte containing solid particles which are at least partially active and/or solid particles transporting at least one active material, the density of the particles being greater than the density of the electrolyte, is characterized by the fact that the flow takes place in such a manner that the particles form a sedimentation bed which is contiguous to the lower face of the compartment and is entrained by the electrolyte.

In order to obtain a "sedimentation bed", the general characteristics of the flow are selected in such a manner that the concentration of particles in the electrolyte is higher in the vicinity of the lower face than in the regions remote from said face. The particles, which are thus preferentially concentrated as a result of their weight in the vicinity of the lower face in a space referred to as the "sedimentation bed", are entrained by the electrolyte.

It is surprising that it is possible to use, in accordance with the invention, the sedimentation of particles in a sedimentation bed which is contiguous to the lower face of electrochemical generators without causing a stationary, passive deposit of these particles. The result obtained by means of the present invention appears to be related to the relatively small thickness of the flow veins in the compartments of the invention, that is to say to the relatively small distance between the lower and upper faces of these compartments. The invention also relates to electrochemical generators employing said process.

The invention will be readily understood from the description of nonlimitative illustrative embodiments given below with reference to the drawing in which.

Figure 1:
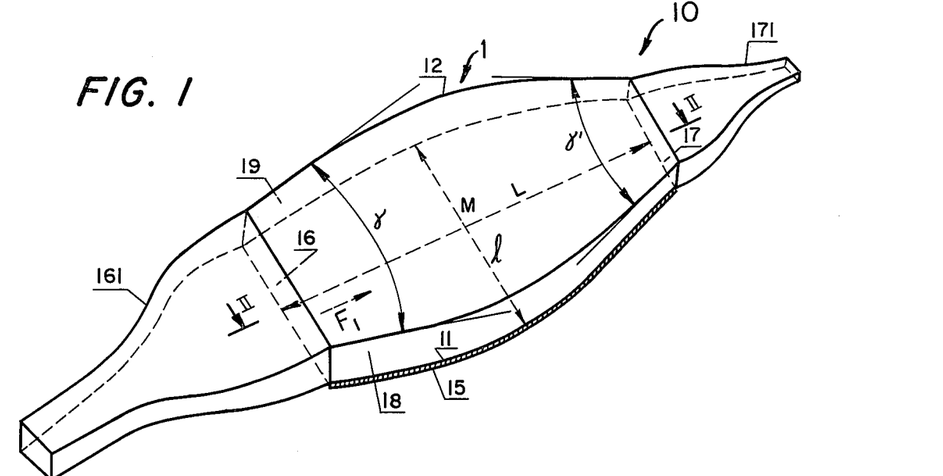
FIG. 1 shows diagrammatically a generator in accordance with the invention.
Figure 2:
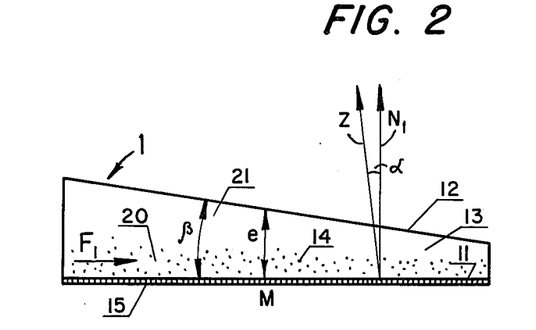
FIG. 2 shows diagrammatically a longitudinal section through the compartment in accordance with the invention of the generator shown in FIG. 1, this section being taken along a plane II—II in FIG. 1 which plane is parallel to the average direction of flow in this compartment and perpendicular to the lower face of the compartment.

FIGS. 1 and 2 show a compartment 1 in accordance with the invention which is a part of an electrochemical generator 10. The compartment 1 comprises a lower face 11 and an upper face 12. The faces 11 and 12, which are substantially flat, form with each other the angle $\beta$ so that they converge in the direction of the average direction of flow which is directed along the arrow $F_1$, these faces 11 and 12 being perpendicular to a vertical plane parallel to the direction $F_1$.

The normal $N_1$ to the lower face 11 forms the angle $\alpha$ with the ascending vertical Z, said normal being oriented towards the electrolyte 13. The compartment 1 is limited on its sides by the side faces 18 and 19, which are, for instance, substantially vertical and perpendicular to the lower face 11. The side faces 18 and 19 in the vicinity of the upstream end 16 of the compartment, the so-called inlet, from the angle $\gamma$ so as to diverge in the direction $F_1$ of the flow. In the vicinity of the downstream end 17 of the compartment, referred to as the outlet, they furthermore form the angle $\gamma'$ so as to converge in the direction $F_1$ of the flow. The compartment 1 is filled with a liquid electrolyte 13 in which there are contained solid particles 14 whose density is greater than that of the electrolyte 13. The lower face 11, which is impermeable to the electrolyte 13 and to the particles 14, is formed by the electrically conductive surface of an electron collector 15.

The compartment 1 is connected by its inlet 16 to a feed device 161 which makes it possible to introduce the electrolyte 13 containing the particles 14 into said compartment. The compartment 1 is furthermore connected by its outlet 17 to an evacuation device 171 which makes it possible to evacuate from said compartment the electrolyte 13 containing the particles 14, with the exception, of course, of those which may have been consumed in their entirety by the electrochemical reaction.

The feed and evacuation devices are so adjusted that the electrolyte 13 flows in the compartment 1 in a substantially nonturbulent flow the average direction of which is oriented along the arrow $F_1$, the direction of which extends from the feed device 161 to the evacuation device 171.

The feed device 161 and the evacuation device 171 therefore make it possible to create a flow through the compartment 1 of the electrolyte 13 containing the particles 14, this flow having the average direction $F_1$.

In view of the substantially nonturbulent flow of the electrolyte 13 in the compartment 1, the particles 14 settle out, that is to say they concentrate as a result of their weight in the sedimentation bed 20 contiguous to the lower face 11. The concentration of particles 14 in the electrolyte 13 in the bed 20 is substantially greater than the concentration of particles 14 in the electrolyte 13 in the space 21 remote from the lower face 11. As a result of the weight of the particles 14, the speed of entrainment of the particles 14 by the electrolyte 13 and the concentration of the particles 14 in the sedimentation bed 20, these particles 14 are now in contact with the surface 11 of the electron collector 15 and now within the sedimentation bed 20, or more rarely within the space 21 remote from the surface 11 of the electron collector 15. These movements favor the diffusion into the electrolyte 13 of the products resulting from the electrochemical reaction or the diffusion of the active material, the electron exchanges being capable of taking place upon the contacts of the particles 14 with the electron collector 15 or upon the contacts of the particles 14 with each other.

One thus avoids the polarization of the particles 14 while assuring substantial electron intensity due to the concentration of the particles 14 in the sedimentation bed 20 which is entrained by the electrolyte 13.

The angle $\alpha$, which is less than 90°, is preferably at most equal to 45° and advantageously at most equal to 30°, for instance substantially zero.

As a matter of fact, for excessively high values of the angle $\alpha$ the number of contacts of the particles 14 with the electron collector 15 becomes insufficient, which decreases the power of the electrochemical generator 10.

This angle of divergence $\gamma$ facilitates the formation of the sedimentation bed 20 in the vicinity of the inlet 16 of the compartment 1. The angles of convergence $\beta$ and $\gamma'$ facilitate the entrainment of the sedimentation bed 20 through the compartment 1. When the formation of the sedimentation bed 20 can be obtained in the vicinity of the inlet 16 of the compartment 1 without divergence angle $\gamma$, it may be advantageous to have the side faces 18 and 19 converge over the greater part or all of the compartment 1.

The angle $\beta$ is preferably at most equal to 10° and advantageously at most equal to 1°. The angles $\Gamma$ and $\gamma'$ are preferably at most equal to 20° and advantageously at most equal to 15°.

The other parameters which participate in the production of the sedimentation bed 20 are the following:

$d_o$ = density of the particles 14; $d_1$ = density of the electrolyte 13; D = average diameter of the particles 14 in the electrolyte 13; $u$ = average velocity of the flow in the compartment 1, that is to say the ratio:

$$\frac{\text{Total vol. flow of particles 14 and electrolyte 13}}{\text{Average cross section of the flow vein}}$$

this average cross section being measured perpendicular to the average direction $F_1$ of flow, at a point M located substantially in the center of the compartment 1; $\mu$ = viscosity of the electrolyte 13; $e$ = average distance between the lower face 11 and the upper face 12 of the compartment 1; $L$ = average length of the compartment 1; $l$ = average width of the compartment 1; $e$, $L$ and $l$ being measured substantially at the point M, the measurement being made perpendicular to the lower face 11 in the case of $e$, parallel to the mean direction $F_1$ of flow in the case of L, and perpendicular to said direction in the case of $l$; R, $$\text{Reynolds number,} = \frac{2 d_1 e u}{\mu};$$

$v/V$ = ratio between total volume $v$ of particles 14 in compartment 1 and total volume $V$ of electrolyte 13 in compartment 1 at any given moment.

Preferably, $d_o$ is at least equal to 2.5; $d_1$ is at most equal to 1.6; $D$ is at least equal to 30 microns; $u$ is between 5 m/minute and 60 m/minute; $e$ is at most equal to 1 cm; the ratio of $l/e$ is at least equal to 10; $L$ is between 10 cm and 1 m, $L$ varying in the same direction as the ratio $$\frac{e^a u^b \mu^c}{(d_0 - d_1) d_D 2f},$$

$a, b, c, d$ and $2f$ being positive exponents; R is at most equal to 4000; $v/V$ is at most equal to 0.30; $\mu$ is at most equal to 0.01 poiseville.

Advantageously, $d_o$ is at least equal to 4; $d_1$ is at most equal to 1.4; $D$ is at least equal to 40 microns; $u$ is between 10 m/minute and 30 m/minute; $e$ is between 1 mm and 5 mm; $l/e$ is at least equal to 20; $L$ is between 20 cm and 60 cm; R is at most equal to 3000; $v/V$ is at most equal to 0.15; $\mu$ is at most equal to 0.005 poiseville.

In order to prevent an accumulation of the particles 14 on one side of the compartment 1, one avoids imparting to this compartment 1 a transverse inclination with respect to the horizontal plane of more than 20°, the embodiment shown in FIGS. 1 and 2 corresponding to an inclination of zero.

Figure 3:
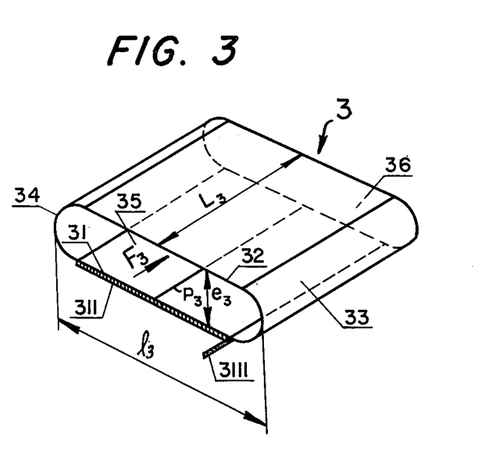
FIG. 3 shows diagrammatically a compartment in accordance with another embodiment of the invention.

In order to facilitate the flow of the electrolyte 13 and of the particles 14, it may be advantageous to impart to one or more of faces 11, 12, 18 and 19 a concave shape, for instance, a semicylindrical or semi-frustoconical shape in the case of the side faces 18 and 19, the concavity facing the electrolyte 13 of the compartment 1. FIG. 3 shows a compartment 3 which has such an arrangement. The compartment 3 is formed of a lower face 31 and an upper face 32, these faces being for instance substantially flat and horizontal, arranged one above the other, and having the shape of equal rectangles. The lower face 31 is formed by the upper surface of an electron collector 311 connected in a manner known per se to an electric terminal 3111. The faces 31 and 32 are connected on two sides by two concave side faces 33 and 34 having the shape of semicylinders of revolution, the concavities facing the electrolyte (not shown) of the compartment 3. The inlet 35 and the outlet 36 of the compartment 3 are connected to a feed device and an evacuation device, respectively (not shown), permitting the introduction into and discharge from the compartment 3 of an electrolyte containing solid particles whose density is greater than that of the electrolyte. The electrolyte flows in the compartment 3 from the inlet 35 towards the outlet 36 in a substantially nonturbulent flow with an average direction oriented along the arrow $F_3$ parallel to the plane P, which is the plane of symmetry of the compartment 3. This plane P, which is perpendicular to the lower face 31, is represented by its trace $P_3$ on this face. The particles (not shown) form a sedimentation bed which is entrained by the electrolyte, similar to the bed 20 described previously. The concave side faces 33 and 34 facilitate the flow of the sedimentation bed, eliminating stagnation on the side portions of the compartment 3 and therefore the fixing and accumulation of the particles and their polarization.

The concave faces 33 and 34 can be made, for instance, of a rigid insulating material, for instance, a plastic. In order still further to increase the electronic exchanges, all or part of these faces can also be made of an electronconducting material, for instance, the same material as the surface of the electron collector 311, the essential factor being that there be no electronic contact between the collector 311 and the compartment (not shown) which is associated electrochemically with the compartment 3. Moreover, the areas of the faces 31 and 32 have been shown as being equal, but faces 31 and 32 of different areas can also be contemplated.

The compartment 3 is used, for instance, as anode compartment to effect the electrochemical oxidation of an active metal constituting all or part of the particles circulating in this compartment, these particles being in particular particles of zinc in a alkaline electrolyte. The surface of the anode collector arranged on the electrolyte side and which is a conductor of electricity and impermeable to the electrolyte and the particles, can for instance be formed in whole or in part of a metal material which is in passivated state under the conditions of operation of the compartment 3, as described in French patent application No. 75/24,205, filed on Aug. 1, 1975, which corresponds to U.S. application Ser. No. 707,778, filed July 22, 1976.

The term "passivated state" means that the metallic material of the surface of the collector is covered with a layer comprising one or more inorganic compounds of at least one of the metals constituting said metallic material.

This passivating layer, which is formed, for instance, when the collector is in contact with atmospheric air or electrolyte, prevents direct contact of the anode particles with the metallic material of the surface of the collector. The metallic materials which can give rise to a passivated state of the surface of the collector are, in particular, magnesium, scandium, yttrium, lanthanum, titanium, zirconium, hafnium, niobium, tantalum, and chromium, or certain of their alloys with each other or with other metals.

The use for the surface of the collector of a metallic material in passivated state has the advantage of avoiding the fixing and agglomerating of the particles on the surface of the collector, such fixing and agglomerating having possibly a tendency to occur in contact with nonpassivated metallic materials. It is obvious, however, that the surface of the collector in contact with the electrolyte and the particles can be made of metallic materials which are not in passivated state under the conditions of operation of the generator, for instance, copper.

The upper face 32 of the compartment 3 is formed of the lower face of a cathode compartment (not shown) comprising a cathode whose active material is oxygen migrating in said cathode and which is formed, for instance, in known manner essentially of carbon, silver, polytetrafluorethylene, and nickel. It is covered on its face arranged on the electrolyte side by a thin hydrophilic separator which is a nonconductor of electrons, permeable to the electrolyte, and impermeable to the zinc-air type comprising, for instance, the anode comtuting the upper face 32.

Figure 4:
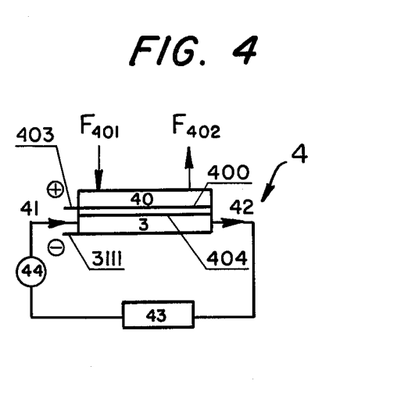
FIG. 4 shows diagrammatically a generator employing the compartment shown in FIG. 3.

FIG. 4 shows diagrammatically a generator of the zince-air type comprising, for instance, the anode compartment 3 described above and a cathode compartment 40 with the airor oxygen-diffusion cathode 400 described above. This cathode 400 is connected in known manner to a positive terminal 403, the arrows F401 and F402 symbolizing the feed and evacuation, respectively, of gas into said cathode compartment and out of said compartment, the separator 404 having the same arrangement and characteristics as previously described. The feed and evacuation devices of the electrolyte containing particles of zinc are represented schematically by the arrows 41 and 42. Outside the compartment 3, between the evacuation device 42 and the feed device 41, an electrolyte and zinc-particle reservoir 43 and a pump 44, which are arranged in series, permit the recycling of the electrolyte containing the particles of zinc in the compartment 3.

The operating conditions, which are in no way limitative, are, for instance, the following:

electrolyte: 4 to 12 N potassium hydroxide (4 to 12 mols of potassium hydroxide per liter), average size of the zinc particles introduced into the electrolyte: 10 to 20 microns, percentage by weight of zinc in the electrolyte: 20% to 30% of the weight of the electrolyte, i.e., a ratio of $v/V$, as previously defined, between 0.04 and 0.06 (This percentage is maintained practically constant due to a feed device (not shown) which discharges, for instance, into the reservoir 43.), average velocity of flow in the anode compartment: 10 m/minute to 30 m/minute, the distance $e_3$ between the lower face 31 and the upper face 32, measured perpendicular to the lower face 31, is between 1 and 5 mm, for instance, substantially equal to 2 mm, the length $L_3$ of the compartment is between 20 cm and 60 cm, the width $l_3$ of the compartment is between 5 cm and 15 cm, the ratio $l_3/e_3$ being at least equal to 20, $L_3$ being measured parallel to the average direction of flow $F_3$, and $l_3$ being the extreme distance between the side edges 33 and 34.

The sedimentation is obtained despite the fineness of the initial zinc particles, because the initial fine particles agglomerate due to the basic electrolyte so as to form coarser particles whose average diameter is generally greater than or equal to 50 microns, which phenomenon takes place in general whatever the origin of the initial particles.

During the test, the concentration of oxidized zinc dissolved in the form of potassium zincate in the electrolyte is maintained less than a predetermined value equal, for example, to about 120 g/liter in the case of 6N potassium hydroxide, so that the zinc particles are not made inactive by an accumulation of the reaction products on their surface or near their surface. This result can be obtained either by replacing the zincated electrolyte by a fresh solution of potassium hydroxide without zincate when its concentration of dissolved zinc becomes excessive, or by continuously regenerating the zincated electrolyte in an installation, not shown in the drawing.

In this way one can continuously obtain a power of the order of 50 watts for a current density equal substantially to 150 mA per $cm^2$ of the face 32 of the air electrode.

It may be advantageous to employ, in the compartments in accordance with the invention, a lower compartment face having, on at least a portion of its surface, relief elements arranged above a surface, possibly at least in part immaterial, referred to as the base surface, which may, for instance, be flat. When the lower face of the compartment does not have such relief element, its base surface is obviously the same as its actual surface.

These relief elements must be designed so as to preserve the sedimentation bed of particles and to cause an attenuated stirring of said sedimentation bed in the vicinity of the lower face as a result of the channeling thereof along the lower face, which has thus been broken up, to the exclusion of agitation of the particles, which might cause them to be distributed substantially homogeneously throughout the entire mass of the electrolyte. At least a part, and preferably all, of these relief elements consist of at least a part of the surface of the collector arranged on the electrolyte side.

Figure 5:
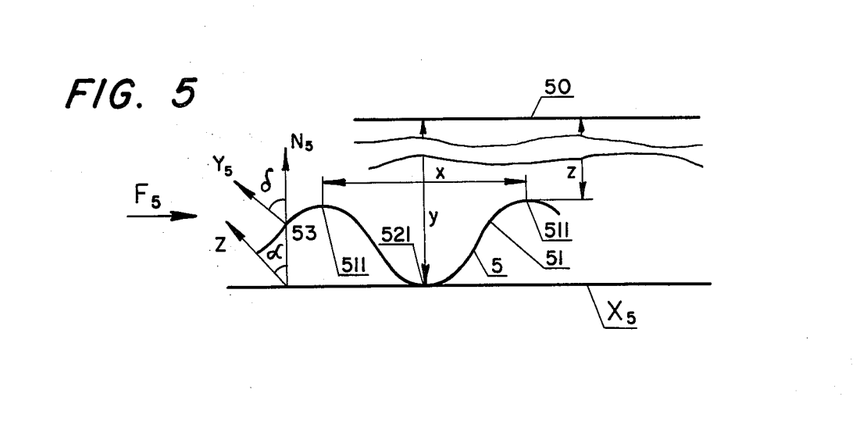
FIGS. 5 and 6 represent diagrammatically crosssections of lower face portions in accordance with the invention having elements in relief, these sections being taken along planes parallel to the average directions of flow and perpendicular to the base surfaces of these lower face portions.

FIG. 5 shows, in section, in a substantially vertical plane parallel to the average direction of flow oriented in the direction indicated by the arrow $F_5$, a portion 5 of a lower face in accordance with the invention having relief elements 51 of curved shape, arranged above a base surface $X_5$. Any normal $N_5$ to the base surface $X_5$, said normal being directed towards the electrolyte, forms with ascending vertical Z an angle $\alpha$ of less than 90°, and preferably at most equal to 45°, and still preferably at most equal to 30°, for example, substantially zero. $x$ represents the distance between the vertices 511 of two adjacent relief elements 51; $y$ represents the distance between the trough bottom 521 located between these two relief elements on the surface $X_5$ and the portion 50 of the upper face located above the lower face portion 5. $z$ represents the distance between either of the two vertices 511 and the upper face portion 50, $y$ and $z$ measured perpendicular to the base surface $X_5$. $Y_5$ is the normal directed towards the electrolyte at any point 53 of said portion 5 of a lower face. $\delta$ is the angle which the said normal $Y_5$ forms with a normal $N_5$ to the base surface $X_5$, the said normal being oriented towards the electrolyte and passing through the point 53. Preferably, the ratio $Y/z$ is between 1.2 and 3, the ratio $x/(y - z)$ is between 1 and 5, and the angle $\delta$ is less than 90°. The angle $\delta$ is preferably selected at most equal to 45°. The relief elements 51 may be of very variable shape, for instance, have the shape of conical frustums. It is not necessary that the relief elements 51 have curved shapes. They may be formed of flat faces forming, for instance, prisms or pyramids.

Figure 6:
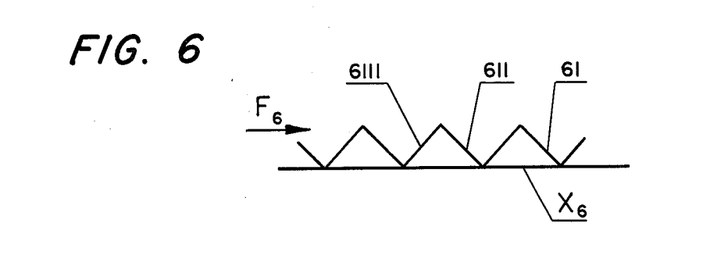

FIG. 6 shows in cross section, along a vertical plane parallel to the average direction of flow oriented in accordance with the arrow $F_6$, a lower face portion 61 having relief elements 611 formed of flat faces 6111 in the form of sawteeth, arranged above a flat base surface $X_6$. When the flat faces 6111 form pyramids, the preferential and advantageous ratio and angle values defined above for the relief elements are still valid. It is moreover preferable that, in the event that the elements 611 are pyramids, the lines 6111 shown in FIG. 6, that is to say located in a plane parallel to the average direction of flow, be edges, that is to say lines connecting adjacent pyramide faces, so as to facilitate the flow of the electrolyte and of the particles.

Providing a generator compartment with a lower face having relief elements in accordance with the invention presents the following additional advantages:

the presence of these relief elements makes it possible, for the same distance between the said base surface and the upper face, that is to say for a given distance $e$, to bring the effective surface of the lower face closer to that of the upper face, which decreases the internal resistance of the generator;

the increase in the contact surface between the lower face and the particles for a given size of the compartment makes it possible to increase the number of contacts between the particles and the surface of the collector. One can therefore decrease the concentration of the particles in the electrolyte for the same electric power of the generator in accordance with the invention;

the attenuated stirring of the sedimentation bed favors the diffusion of the reaction products within the electrolyte or the diffusion of the active material, which still further reduces the polarization of the particles.

By way of example, the replacing within compartment 3 of the flat surface 31 of the collector by a surface having relief elements in accordance with the invention makes it possible to preserve the power of the generator 4 by limiting the concentration by weight of zinc particles in the electrolyte to 10%, the other operating parameters remaining unchanged. Such a decrease in the concentration of particles facilitates the flow of the electrolyte and of the particles in the generator 4 and advantageously decreases the power necessary in order to obtain this circulation.

When the lower face of a compartment in accordance with the invention has relief elements arranged above a base surface, the preferred values and ratios indicated above for a lower face without such elements still apply, provided that the distance e and the angle of convergence $\beta$ which have been defined above are measured from the said base surface. The cathode of the compartment 40 has been described as being a gas diffusion electrode. It is obvious that other types of electrodes could be used in combination with this compartment without it being necessary to modify the principle thereof, for instance, a metallic oxide electrode, in particular a silver oxide electrode in the event that the particles used in the compartment 3 are formed of zinc, in whole or in part.

Figure 7:
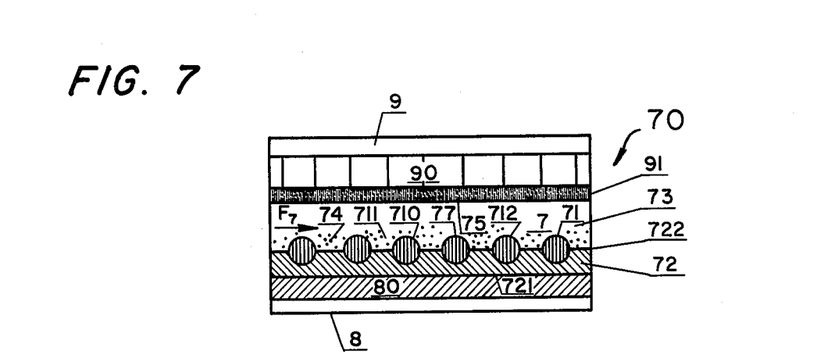
FIG. 7 represents diagrammatically a section through a compartment in accordance with the invention having an electrolyte-permeable lower face, this section being taken along a plane parallel to the average direction of flow and perpendicular to the base surface of the lower face.

The lower compartment faces previously described in accordance with the invention are impermeable to the electrolyte and to the particles. However, it is possible in another variant embodiment to contemplate lower faces which are permeable to the electrolyte, for example, lower faces made of grids or perforated plates. FIG. 7 shows in cross section along the average direction of flow oriented in accordance with the arrow $F_7$, a generator 70 having a compartment 7 in accordance with the invention, whose collector 71 is in the form of a metal grid, partially enclosed in a hydrophilic separator 72 which is a nonconductor of electricity, permeable to the electrolyte 73, and impermeable to the solid particles 74 of the compartment 7. The surfaces of the separator 72 and the grid 71 which are in contact with the electrolyte thus constitute the lower face 77 of the compartment 7.

The portions 712 of the grid 71 which are in contact with the electrolyte 73 and the particles 74 of the compartment 7 thus constitute relief elements similar to the relief elements described above.

The empty spaces 711 of the grid 71 permit the electrolyte to migrate through the separator 72 between the compartment 7 and another compartment 8 having an electrode 80 contiguous to the face 721 of the separator 72 and opposite the compartment 7. There thus takes place an ionic communication between the compartments 7 and 8. The particles 74 which are present in the empty spaces 711 cannot penetrate into the separator 72 and therefore they do not risk causing electric short circuits with the compartment 8.

In order to avoid short circuits, the grid 71 is preferably totally enclosed in the separator 72 on the side facing the compartment 8.

The compartment 7 may furthermore, as previously described, be in ionic communication with another compartment 9 having an electrode 90 applied for instance against the upper face of a porous separator 91, similar to the separator 404 previously described, the lower face of this separator 91 constituting the upper face 75 of the compartment 7. When the separators 91 and 72 have identical ion conductivity characteristics and when the electrodes 80 and 90 are of the same type and have identical active surfaces, it is found that a power is obtained which is substantially twice that which would be obtained with a single one of these electrodes. This result is illustrated by the following example: The cell 70 is of the metal/air type, the particles 74 being in particular zinc particles in an alkaline electrolyte, the operating characteristics being similar to those previously described, i.e., in particular: Electrolyte: 4 to 12 N potassium hydroxide; average size of the zinc particles introduced into the electrolyte: 10 to 20 microns; percentage by weight of zinc in the electrolyte: 20% to 30% of the weight of the electrolyte; velocity of circulation: 10 m/minute to 30 m/minute; the electrodes 80 and 90 are air or oxygen diffusion electrodes which are identical in composition and in dimensions (circulation of air of oxygen not shown). It is then found that the power obtained when using the two cathodes 80 and 90 is substantially twice the power obtained when using a single one of these two cathodes 80 or 90, the other operating characteristics being identical, that is to say the operation of these two cathodes is symmetrical.

This result is surprising; as a matter of fact, the concentration of the particles in the sedimentation bed contiguous to the lower face 77 could have led one to expect that the lower cathode 80 would participate more in the power of the cell than the upper cathode 90, since the distance between the upper vertices 710 of the grid 71 and the cathode 90 is more than ten times greater than the thickness of the separator 72 in the example selected (this ratio has not been respected in the diagrammatic FIG. 7 in order to simplify the drawing), this structural asymmetry permitting one to predict asymmetry in operation. The result obtained is explained, perhaps, by the face that the ion exchanges between the compartment 7 and the upper cathode 90 take place, to a good extent, between the top of the sedimentation bed and said cathode. This result remains when the grid 71 is replaced by a perforated metal plate without relief elements. The structure of the cell 70 thus makes it possible to produce compact generators of high power.

Of course, the invention is not limited to the embodiments described above, on basis of which other manners and forms of embodiment can be contemplated without thereby going beyond the scope of the invention.

Accordingly, the invention extends, for instance, to cells each having a plurality of compartments in accordance with the invention and to compartments in accordance with the invention each comprising several collectors, as well as to generators whose devices for the recirculation of the electrolyte and the particles comprise devices for treatment of the electrolyte and/or the particles, in particular electrolytic or chemical regenerating devices. It is furthermore obvious that the invention applies whatever the arrangement of the cells, in series or in parallel, when the generator comprises several cells in accordance with the invention.

What is claimed is:

1. A process for the production of electric current utilizing electrochemical reactions in a generator comprising at least one cell having at least one compartment containing a liquid electrolyte and having a lower face formed at least in part by all or part of the surface of at least one electron collector arranged on the electrolyte side, the said process consisting in creating a flow through the compartment of the electrolyte containing solid particles which are at least partially active and/ or solid particles transporting at least one active material, the density of the particles being greater than the density of the electrolyte, characterized by the face that the flow takes place in such a manner that the particles form a sedimentation bed which is contiguous to the lower face of the compartment and is entrained by the electrolyte.

2. The process for the production of electric current according to claim 1, characterized by the fact that the average velocity $u$ of the flow in the compartment is between 5 m/minute and 60 m/minute and by the fact that the Reynolds number R corresponding to the flow is at most equal to 4000.

3. The process for the production of electric current according to claim 2, characterized by the fact that the average velocity $u$ is between 10 m/minute and 30 m/minute and by the fact that the Reynolds number R is at most equal to 3000.

4. An electrochemical generator comprising at least one cell having at least one compartment containing a liquid electrolyte and comprising an inlet, an outlet, two side faces, an upper face and a lower face, said lower face being provided with a base surface and being formed at least in part by all or part of the surface of at least one electron collector arranged on the electrolyte side, the compartment being connected by its inlet to a feed device and by its outlet to an evacuation device, the said device making it possible to create a flow through the compartment of the electrolyte containing at least partially active solid particles and/or solid particles transporting at least one active material, the density of the particles being greater than the density of the electrolyte, characterized by the fact that any normal drawn to the base surface of the lower face of the compartment forms with the ascending vertical an angle $\alpha$ of less than 90°, said normal being oriented towards the electrolyte side, and characterized by the fact that the particles are present in the compartment in the form of a sedimentation bed which is contiguous to the lower face and is entrained by the electrolyte.

5. The electrochemical generator according to claim 4, characterized by the fact that the angle $\alpha$ is at most equal to 45°.

6. The electrochemical generator according to claim 5, characterized by the fact that the angle $\alpha$ is at most equal to 30°.

7. The electrochemical generator according to claim 6, characterized by the fact that the angle $\alpha$ is substantially zero.

8. The electrochemical generator according to claim 4, characterized by the fact that the upper face and the base surface of the lower face of the compartment are flat.

9. The electrochemical generator according to claim 8, characterized by the fact that the lower face is flat.

10. The electrochemical generator according to claim 8, characterized by the fact that the upper face and the base surface of the lower face are parallel.

11. The electrochemical generator according to claim 8, characterized by the fact that the upper face and the base surface of the lower face have substantially the shape of equal rectangles.

12. The electrochemical generator according to claim 4, characterized by the fact that the upper face and the base surface of the lower face form with each other an angle $\beta$ being at most equal to 10°.

13. The electrochemical generator according to claim 4, characterized by the fact that the side faces are flat.

14. The electrochemical generator according to claim 4, characterized by the fact that the side faces are concave and their concavities face the electrolyte of the compartment.

15. The electrochemical generator according to claim 10, characterized by the fact that the side faces are semi-cylinders of revolution.

16. The electrochemical generator according to claim 4, characterized by the fact that the width of the compartment is constant.

17. The electrochemical generator according to claim 4, characterized by the fact that the side faces form with each other near the inlet of the compartment an angle $\gamma$ which diverges in the direction of the average direction of flow, the angle $\gamma$ being at most equal to 20°.

18. The electrochemical generator according to claim 4, characterized by the fact that the side faces form with each other, over at least a part of the compartment, an angle $\gamma'$ which converges in the direction of the average direction of flow, the angle $\gamma'$ being at most equal to 20°.

19. The electrochemical generator according to claim 4, characterized by the fact that the compartment comprises a plane of symmetry parallel to the average direction of flow and perpendicular to the base surface of the lower face.

20. The electrochemical generator according to claim 4, characterized by the fact that the side faces are formed at least in part of a portion of the surface of the electron collector arranged on the electrolyte side.

21. The electrochemical generator according to claim 4, characterized by the fact that the lower face comprises, over at least a portion of its surface, relief elements arranged above the base surface, each of said relief elements having a vertex at the place where it is furthest from the adjacent base surface and two adjacent relief elements defining a trough the bottom of which is located on the base surface.

22. The electrochemical generator according to claim 21, characterized by the fact that, $x$ being the distance between the vertices of two adjacent relief elements, $y$ being the distance between the bottom of the trough located between said two relief elements and the upper face, $z$ being the distance between either of these two vertices and the upper face, $y$ and $z$ being measured perpendicular to the base surface, the ratio $y/z$ is between 1.2 and 3 and the ratio $x/(y - z)$ is between 1 and 5.

23. The electrochemical generator according to claim 21, characterized by the fact that, $\delta$ being the angle, at one point of the surface portion of the lower face, between the normal directed towards the electrolyte from said surface portion and the normal to the base surface passing through said point, the angle $\delta$ is at most equal to 45°.

24. The electrochemical generator according to claim 4, characterized by the fact that the lower face of the compartment is impermeable to the electrolyte and to the particles.

25. The electrochemical generator according to claim 4, characterized by the fact that the lower face is permeable to the electrolyte and impermeable to the particles.

26. The electrochemical generator according to claim 4, characterized by the fact that, $d_0$ being the density of the particles, $d_1$ being the density of the electrolyte, D being the average diameter of the particles in the electrolyte, $e$ being the average distance between the lower and upper faces, L being the average length and $l$ being the average width of the compartment, $v/V$ being the ratio, within the compartment, between the volume $v$ of the total particles and the volume V of the electrolyte, $\mu$ being the viscosity of the electrolyte, $d_0$ is at least equal to 2.5, $d_1$ is at most equal to 1.6, D is at least equal to 30 microns, $e$ is at most equal to 1 cm, the ratio of $l/e$ is at least equal to 10, L is between 10 cm and 1 m, the ratio $v/V$ is at most equal to 0.30, and $\mu$ is at most equal to 0.01 poiseville.

27. The electrochemical generator according to claim 26, characterized by the fact that $d_0$ is at least equal to 4, $d_1$ is at most equal to 1.4, D is at least equal to 40 microns, $e$ is between 1 mm and 5 mm, $l/e$ is at least equal to 20, L is between 20 cm and 60 cm, $v/V$ is at most equal to 0.15, and $\mu$ is at most equal to 0.005 poiseville.

28. The electrochemical generator according to claim 4, characterized by the fact that is comprises a recycling means which connects the evacuation device to the feed device.

29. The electrochemical generator according to claim 4, characterized by the fact that the compartment is an anode compartment, the particles are formed in whole or in part by an anode active metal, the compartment is ionically connected at its upper face and/or its lower face with at least one cathode compartment having a cathode with an active material.

30. The electrochemical generator according to claim 29, characterized by the fact that the anode active metal is zinc, the cathode active material is oxygen or at least a compound of oxygen, and the electrolyte is an alkaline electrolyte.

31. The electrochemical generator according to claim 29, characterized by the fact that the surface of the collector arranged on the electrolyte side is made of a passivated metal material comprising at least one of the following metals: magnesium, scandium, yttrium, lanthanum, titanium, zirconium, hafnium, niobium, tantalum, and chromium.

* * * * *

UNITED STATES PATENT OFFICE
CERTIFICATE OF CORRECTION

Patent No. 4,092,461      Dated May 30, 1978

Inventor(s) Pierre Durand

It is certified that error appears in the above-identified patent and that said Letters Patent are hereby corrected as shown below:

Col. 2, line 9, "consituting" should read -- constituting --.
Col. 4, line 44, "$\Gamma$ and $\gamma'$ " should read -- $\gamma$ and $\gamma'$ --.
Col. 6, line 15, "a alkaline" should read -- an alkaline --; line 61, delete "zinc-air type comprising, for instance, the anode com-" and insert -- zinc particles, the lower face of this separator consti- --; line 64, "zince-air" should read -- zinc-air --; line 66, "airor" should read -- air- or --.
Col. 7, line 67, "element" should read -- elements --. Col. 8, line 29, after "z" insert -- being --; lines 35 and 36, "x/(y - z)" should read -- x/y - z --. Col. 9, line 51, after "and" insert -- of --. Col. 10, line 47, "face" should read -- fact --. Col. 11, line 15, "face" should read -- fact --; line 40, "said device" should read -- said devices --. Col. 14, line 4, "is" should read -- it --.

Signed and Sealed this

Fifth Day of December 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,092,461  Dated May 30, 1978

Inventor(s) Pierre Durand

It is certified that error appears in the above-identified patent and that said Letters Patent are hereby corrected as shown below:

Col. 8, line 35, "Y/z" should read -- y/z --. Col. 5, lines 18 and 24; col. 13, line 22; and col. 14, line 2; each occurrence, "poiseville" should read -- poiseuille --.

Signed and Sealed this

Twenty-seventh Day of February 1979

[SEAL]

Attest:

RUTH C. MASON
Attesting Officer

DONALD W. BANNER
Commissioner of Patents and Trademarks